(No Model.)
T. H. HICKS.
SYSTEM OF ELECTRIC DISTRIBUTION.
No. 465,854. Patented Dec. 29, 1891.
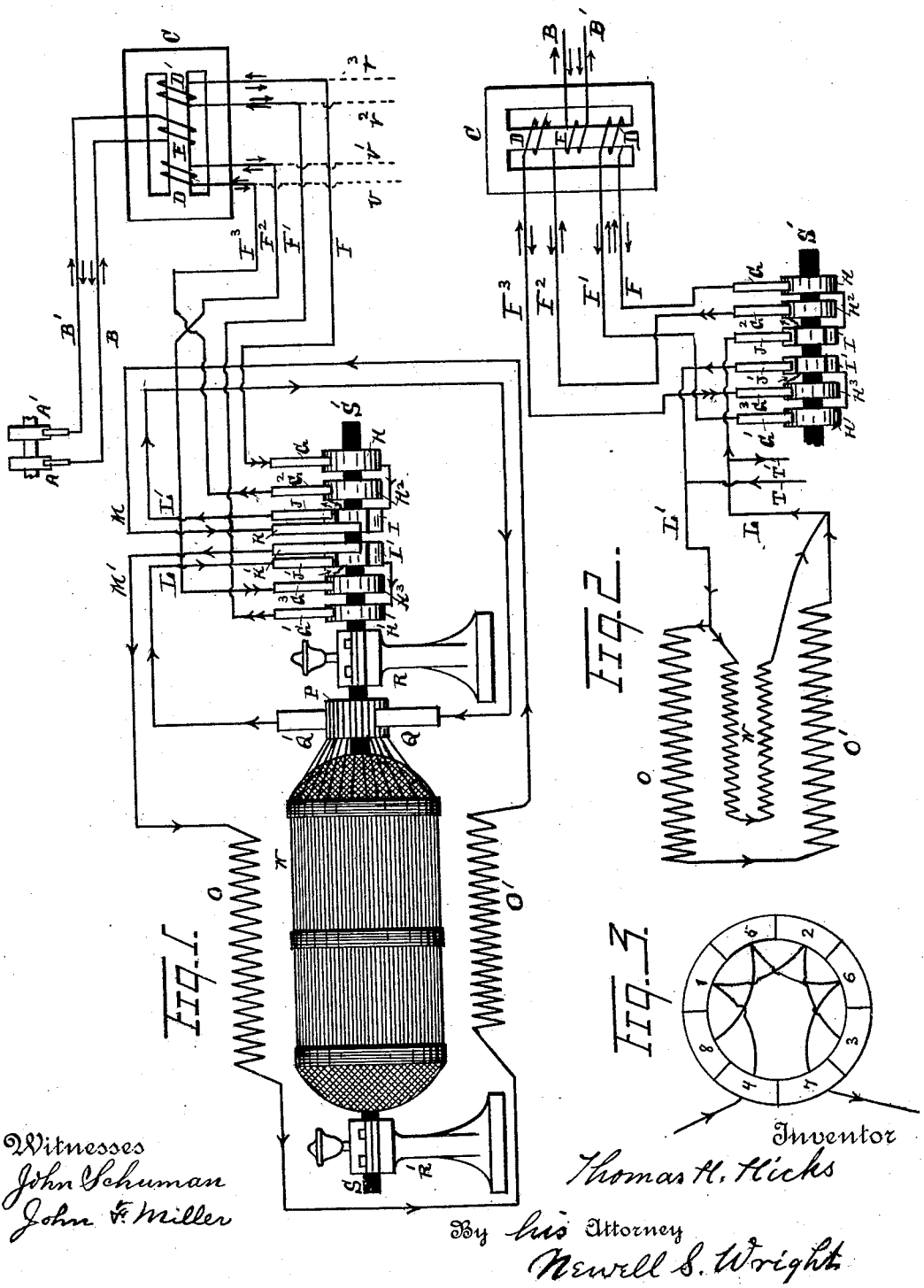

UNITED STATES PATENT OFFICE.

THOMAS H. HICKS, OF DETROIT, MICHIGAN, ASSIGNOR OF ONE-HALF TO GEORGE F. CASE, OF SAME PLACE.

SYSTEM OF ELECTRIC DISTRIBUTION.

SPECIFICATION forming part of Letters Patent No. 465,854, dated December 29, 1891.

Application filed December 26, 1890. Serial No. 375,770. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in Electrical Conversion and Distribution; and I declare the following to be a full, clear, and exact description of the invention, such as will enable others skilled in the art to which it appertains to make and use the same, reference being had to the accompanying drawings, which form a part of this specification.

This invention relates to certain new and useful improvements in electrical conversion and distribution; and the same consists in the peculiar construction, combinations, and arrangements of parts, as hereinafter described and claimed, and illustrated in the drawings, whereby high-tension alternating currents can be reduced to a lower potential continuous current. The alternating current heretofore has been of no practical use, except for incandescent lighting. Its use for motors has proven a typical case of electrical failure. Constant-potential continuous-current systems are failures also, economically, inasmuch as a practical voltage for use is expensive to transmit beyond a few hundred feet. To overcome the loss in transmitting low-potential continuous currents and the impractical features of alternating currents referred to are the special objects of my invention.

In carrying my invention into practice I use a high-potential alternating current for the sake of economy in transmission, and where comparatively low-potential continuous currents are required—such as, for example, for motors and arc lighting—I first reduce the current by a converter to the desired voltage, and then I change the current into one of continuous direction. This I accomplish through a synchronizing-motor, in combination with an appropriate converter and commutating device.

Although I have made use of the expression "reducing the voltage," still it will be readily understood that I can raise the voltage to a higher and continuous current as well as to lower it.

My invention may be clearly understood by reference to the following description and accompanying drawings, the latter clearly illustrating the matter in detail.

In the drawings, Figure 1 is a diagram view showing all parts of my invention, and Fig. 2 is a similar view showing a modification thereof. Fig. 3 is an end view of one of the commutators.

Like letters of reference indicate like parts.

A and A' are the collector-rings and brushes of an alternating-current dynamo located at the main station.

B and B' are conductors conveying the current from the station to any desired place or places where conversion of the alternating current is desired.

C is a converter having two converting induction-coils D D', preferably electrically insulated from each other and from the primary coil E, which latter is in circuit with the high-tension alternating dynamo located at the main works.

F F' F² F³ are conductors conveying converted alternating impulses from said converter to brushes G G' G² G³, which form sliding contacts and convey the currents to collecting-rings H H' H² H³.

I I' are two commutators for shifting the alternating-current impulses at the proper moment to the two sets of brushes forming independent circuits. Said brushes are marked J J' and K K', respectively. These last-named sets of brushes supply two distinct circuits L L' and M M' with continuous currents—*i. e.*, having only one direction in the two lines, respectively.

N is an ordinary Siemens armature, and O O' are representations of its field-coils, connected in series. P is its collector, having a greater number of sections than the commutator I I', and Q Q' are the brushes.

R R' are bearings for the armature-shaft S.

S' is a continuation of the shaft S, and carries the commutators I I' and rings H H' H² H³, which are insulated therefrom.

The modification shown in Fig. 2 dispenses with the set of brushes marked K K' in Fig. 1. Therefore the two induction-circuits F F' and F² F³ are only in use alternately, and in such case the armature and field coils must either be connected in series or in multiple with each other, as in the ordinary shunt-wound motors supplied with constant-potential continuous currents, as shown in Fig. 2. The armature and field windings are shown only, marked N and O O', respectively; but the commutating device is shown in detail.

My special object for using two induction-circuits, it will be seen, is to prevent short-circuiting the current through the commutator, which cannot be avoided when only one circuit and commutator is used. When two commutators working in combination with each other are supplied with currents from two separate circuits, as in my invention, it is impossible to short-circuit the current except through the resistance-circuit where the work is done. Instead of using one converter having two induction-circuits, two converters having only one induction-circuit each may be used. It will be noticed that the direction of currents is indicated in three distinct ways, viz: first, by parallel arrows marked thus ⇌, pointing in opposite directions, said arrows indicating the circuits where alternating currents constantly flow; second, two arrow-heads marked thus →→, which indicate the direction of alternating impulses at the time brushes J J' and K K' are in a certain position on the commutator-sections, and, third, single arrow-heads marked thus →, which point out the circuits where continuous currents of one direction only are passing.

Having thus explained the parts of my invention in detail, I will now mention briefly the principle of operation.

The high-tension alternating current requiring to be reduced in electrical pressure is first sent through the converter C. From the converter it flows through the two induction-circuits which are electrically insulated from each other, marked F F' and $F^2$ $F^3$, respectively. The current in these circuits has been reduced to the desired voltage, but is still alternating in direction. From the rings H H' $H^2$ $H^3$ and their brushes alternating currents are sent through the field-coils O O' and armature N. The armature will then start to rotate, increasing its speed until the brushes J J' and K K' exchange commutator-sections with each other synchronous with the alternations in the dynamo-circuit, at which point of speed it will remain constant, and the motor will then be supplied with continuous constant-potential currents. One of said synchronizing-motors with its current-strengthening device may be used to straighten the current for any number of other motors or produce continuous currents for any and all uses where constant-potential continuous currents are now used.

One great advantage gained by this invention is that from the same high-tension alternating circuits low-potential alternating currents can be taken off for incandescent lighting, motors can be run with continuous currents, arc lights can be supplied with continuous currents of low enough voltage to be practical, and there will be less loss by conversion than would occur if low-potential continuous currents were sent out from a main station through the same conductors appropriate for use where my system of conversion is used.

It is clear that when the current has been made continuous supplemental lines may be supplied for other uses, as shown at T T', Fig. 2. Also, low-potential currents may be taken off from any point in the lines F F' $F^2$ $F^3$, as indicated in dotted lines V V' $V^2$ $V^3$, Fig. 1.

Fig. 3 is an end view representing either of the commutators I I'. It will be seen that the alternate bars are electrically connected together, forming two terminals for contact with their respective collecting-rings. Bars marked 1 2 3 4 form one set, and bars marked 5 6 7 8 form the other set. Thus it will be seen that these are ordinary commutators.

By observing the direction in which the arrow-heads point in the alternating and continuous current circuits the direction of the alternating current impulses through the commutators, field, and armature circuits, together with the alternating interchangeable action occurring between the commutators and field and armature circuits will be readily understood. Starting from the transformer in Fig. 1, the two induction-circuits may be clearly traced, one induction-circuit being through the commutators and armature, while the other is through the commutators and fields, the two induction-circuits being alternately in circuit with the armature and field circuits. One circuit is from line F to brush G, thence to collector-ring H, thence to one set of the alternate section-bars of commutator I, thence to brush J, line L', brush Q, commutator P, armature-circuit N, to brush Q', line L, to brush J', thence through one set of the alternate bars of commutator I', and thence to collector-ring H', through brush G' and line F' back to the converter. Simultaneously with the current impulse through this circuit there is another impulse from the other induction-circuit through the field-coils, but in the reverse direction, as follows: Through induction-line wire $F^3$, brush $G^3$, collector-ring $H^3$, to the other set of alternate section-bars of commutator I', thence through brush K', line M', field-coils O and O', line M, brush K, to the other set of alternate section-bars of commutator I, to collector-ring $H^2$, brush $G^2$, and induction-line wire $F^2$. The next two current impulses from the two induction-circuits will be in opposite direction to the impulses just described, and therefore it is necessary when not commutated that they exchange field and armature circuits with each other in order that continuous currents shall be sent through both armature and field coils. This time the lines F and F' are thrown into circuit with the field-coils O and O', and the lines $F^2$ and $F^3$ in circuit with the armature N. This is accomplished by the commutator-brushes J and K exchanging contacts with the alternate section-bars of commutator I and the brushes J′, and K′ exchanging sections of the commutator I′, due, of course, to the rotary motion of the commutators. It may thus be seen that these two commutators I and I′ exchange field and armature circuits simultaneously with each other and differ in this respect when the circuits are connected in multiple arc, as in Fig. 2. In this latter case the two commutators are only in alternate use with each other, there only being, as it were, one circuit to supply. It will be obvious by further consideration that by using two commutating or current shifting devices in the manner described I interpose simultaneously twice the resistance at the commutator-brushes of each induction-circuit at the time the impulses exchange circuits with each other that I would if I were to only use one commutator and two brushes. Said extra resistance is caused by the extra breaks of the second set of brushes, or, in other words, if one commutator has one-eighth of an inch insulation between its sections the current, when the brushes exchange commutator-sections, would require to jump one-fourth of an inch, less the thickness of the two brushes, to become short-circuited through the commutator; but if two commutators of similar constructions are joined in series with each other, as shown in the drawings, the resistance would be twice one-fourth of an inch, or four times one-eighth of an inch, less the thickness of four brushes, which would be twice the resistance of only one commutator and two brushes. High resistance simultaneously introduced by two commutators in this way is of vital importance in these synchronizing-motors until proper armature-speed is attained; otherwise the induction-currents are apt to become short-circuited through the commutator.

What I claim as my invention is—

1. In a system of electrical distribution and conversion, the combination, with two induction-circuits, of two commutators rotatable together, each commutator divided into two sets of bars electrically insulated from each other, and separate collectors with which each set of commutator-bars is in electrical contact, one collector being in electrical contact with one induction-circuit and the other collector being in electrical contact with the other induction-circuit, substantially as described.

2. In a system of electrical distribution and conversion, the combination, with two induction-circuits, of two commutators rotatable together, each commutator divided into two sets of bars alternately arranged with each other and electrically insulated from each other, and separate collectors with which each set of commutator-bars is in electrical contact, one collector being in electrical contact with one induction-circuit and the other collector being in electrical contact with the other induction-circuit, substantially as described.

3. In a system of electrical distribution and conversion, the combination, with a synchronizing-motor, of three commutators rotatable with the armature-shaft, one of said commutators supplying the armature with converted continuous currents, the other two commutators working together in combination with each other in producing said continuous current, and each of said two commutators consisting of two sets of bars electrically insulated and alternately arranged with each other, and separate collectors rotatable with said commutators and with said armature-shaft and permanently connected to each set of said bars, substantially as described.

4. In a system of electrical distribution and conversion, the combination, with the armature and field-magnets, of a commutating device and a collecting device rotatable on the same shaft, said collecting device constructed with a greater number of sections than said commutating device and being in circuit with the armature, the commutating device being in circuit with the brushes supplying the collector of the armature and the field circuits, said armature and field-magnets being supplied with continuous currents previously converted and rectified by said commutating device, substantially as set forth.

In testimony whereof I sign this specification in the presence of two witnesses.

THOMAS H. HICKS.

Witnesses:
N. S. WRIGHT,
JOHN F. MILLER.